US009308807B2

(12) United States Patent
Hane

(10) Patent No.: US 9,308,807 B2
(45) Date of Patent: Apr. 12, 2016

(54) VEHICLE DRIVE CONTROL APPARATUS, AND VEHICLE DRIVE CONTROL METHOD

(71) Applicant: NISSAN MOTOR CO., LTD., Yokohama-shi, Kanagawa (JP)

(72) Inventor: Shougo Hane, Isehara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/380,275

(22) PCT Filed: Feb. 18, 2013

(86) PCT No.: PCT/JP2013/000877
§ 371 (c)(1),
(2) Date: Aug. 21, 2014

(87) PCT Pub. No.: WO2013/128837
PCT Pub. Date: Sep. 6, 2013

(65) Prior Publication Data
US 2015/0038286 A1 Feb. 5, 2015

(30) Foreign Application Priority Data

Feb. 27, 2012 (JP) ................................. 2012-040363

(51) Int. Cl.
*B60K 6/26* (2007.10)
*B60K 6/52* (2007.10)
(Continued)

(52) U.S. Cl.
CPC . *B60K 6/26* (2013.01); *B60K 6/448* (2013.01); *B60K 6/52* (2013.01); *B60L 11/126* (2013.01);
(Continued)

(58) Field of Classification Search
CPC ............ B60K 6/26; B60K 6/52; B60K 6/448; B60W 10/06; B60W 10/08; B60W 20/00; B60W 20/108; B60W 20/40; B60W 2540/10; B60W 2550/142; B60W 2720/403; Y10S 903/902; B60L 11/126; B60L 11/14; B60L 2260/28; B60L 2220/44; B60L 2240/423; B60L 2240/443; B60L 2240/642; B60L 2250/28; Y02T 10/6243; Y02T 10/6217; Y02T 10/642; Y02T 10/6265; Y02T 10/6286; Y02T 10/7275; Y02T 10/7291
See application file for complete search history.

(56) References Cited

U.S. PATENT DOCUMENTS

| | | |
|---|---|---|
| 6,549,840 B1 | 4/2003 | Mikami et al. |
| 2002/0087252 A1 | 7/2002 | Shimizu et al. |

(Continued)

FOREIGN PATENT DOCUMENTS

| | | |
|---|---|---|
| JP | 2004-215499 A | 7/2004 |
| JP | 2005-059851 A | 3/2005 |
| JP | 2008-201182 A | 9/2008 |

*Primary Examiner* — Jacob S Scott
(74) *Attorney, Agent, or Firm* — Foley & Lardner LLP

(57) ABSTRACT

A total driving force according to an acceleration request of a driver is secured, and deterioration of acceleration performance, such as slowness at the time of starting, is suppressed. When an engine torque is converted into motor torque through a generator, a power distribution ratio $\alpha$ from the engine torque to the motor torque is set. Additionally, as a road surface gradient $\theta$ is smaller on an upward slope side, the power distribution ratio $\alpha$ is limited. Specifically, when the road surface gradient $\theta$ is more than or equal to a predetermined $\theta1$ on the upward slope side, the power distribution ratio $\alpha$ is set to a predetermined maximum value $\alpha_{MAX}$. When the road surface gradient $\theta$ is less than or equal to $\theta2$, which is smaller than $\theta1$, on the upward slope side, the power distribution ratio $\alpha$ is set to a minimum value $\alpha_{MIN}$.

3 Claims, 12 Drawing Sheets

(51) Int. Cl.
*B60L 11/14* (2006.01)
*B60W 10/08* (2006.01)
*B60W 20/00* (2006.01)
*B60K 6/448* (2007.10)
*B60W 10/06* (2006.01)
*B60L 11/12* (2006.01)
*B60L 15/20* (2006.01)

(52) U.S. Cl.
CPC ............ *B60L 11/14* (2013.01); *B60L 15/2081* (2013.01); *B60W 10/06* (2013.01); *B60W 10/08* (2013.01); *B60W 20/00* (2013.01); *B60W 20/108* (2013.01); *B60W 20/40* (2013.01); *B60L 2220/44* (2013.01); *B60L 2240/12* (2013.01); *B60L 2240/14* (2013.01); *B60L 2240/423* (2013.01); *B60L 2240/443* (2013.01); *B60L 2240/465* (2013.01); *B60L 2240/642* (2013.01); *B60L 2250/28* (2013.01); *B60L 2260/28* (2013.01); *B60W 2540/10* (2013.01); *B60W 2550/142* (2013.01); *B60W 2720/403* (2013.01); *Y02T 10/6217* (2013.01); *Y02T 10/6243* (2013.01); *Y02T 10/6265* (2013.01); *Y02T 10/6286* (2013.01); *Y02T 10/642* (2013.01); *Y02T 10/7077* (2013.01); *Y02T 10/7275* (2013.01); *Y02T 10/7291* (2013.01); *Y02T 90/16* (2013.01); *Y10S 903/902* (2013.01); *Y10T 477/23* (2015.01)

(56) References Cited

U.S. PATENT DOCUMENTS

| | | | | |
|---|---|---|---|---|
| 2009/0024262 | A1* | 1/2009 | Amamiya | B60K 6/445 701/22 |
| 2009/0118971 | A1* | 5/2009 | Heap | B60K 6/445 701/102 |
| 2009/0255746 | A1* | 10/2009 | Boesch | B60K 6/365 180/197 |
| 2012/0203406 | A1* | 8/2012 | Akebono | B60W 10/02 701/22 |
| 2013/0211640 | A1* | 8/2013 | Maier | B60K 6/448 701/22 |

* cited by examiner

VEHICLE DRIVE CONTROL APPARATUS, AND VEHICLE DRIVE CONTROL METHOD

TECHNICAL FIELD

The present invention relates to a vehicle drive control apparatus and a vehicle drive control method.

BACKGROUND ART

An earlier technology described in Patent Literature 1 is a vehicle in which front wheels are driven by an engine, the electric power is generated by a part of engine torque, and rear wheels are driven by a motor with the generated electric power. A power distribution ratio of the motor torque to the engine torque is set according to an opening degree of an accelerator pedal.

CITATION LIST

Patent Literature

PTL 1: JP 2004-215499 A

SUMMARY OF INVENTION

Technical Problem

When a part of engine torque is converted into electric energy and the electric energy is converted into motor torque, however, there is an energy loss based on conversion efficiency. For example, in a case where 20% of engine torque is used and converted into the motor torque, when the conversion efficiency in such a case is 60%, 0.2×0.6=0.12. The motor torque to the engine torque is substantially 12%. In other words, the engine torque 0.8+the motor torque 0.12 results in a total driving force of a vehicle 0.92. Therefore, when a distribution rate of the motor torque is enhanced in a state in which an engine drive wheel is free of idle running tendency, the total driving force of a vehicle is reduced by the energy loss. Consequently, acceleration performance is more deteriorated in a vehicle, as the displacement of the engine is smaller, and particularly, there is a possibility that slowness occurs at the time of starting.

An object of the present invention is to secure the total driving force in response to an acceleration request of a driver and to suppress deterioration of acceleration performance, such as the slowness at the time of starting.

Solution to Problem

A vehicle drive control apparatus according to one aspect of the present invention includes: an engine for driving main drive wheels; an electric generator for generating electric power by obtaining power of the engine; and a motor for driving auxiliary drive wheels with the electric power generated by the electric generator. Then, a road surface gradient is detected, and as the road surface gradient is smaller on an upward slope side, a driving force of the electric motor is limited, i.e., reduced.

Advantageous Effects of Invention

According to the present invention, as the road surface gradient is smaller on the upward slope side, that is, in a condition where idling of the main drive wheels hardly occurs, by limiting the driving force of the electric motor to be small, an energy loss based on conversion efficiency is reduced, and total driving force according to an acceleration request of a driver can be secured. Therefore, even in a vehicle in which displacement of an engine is small, deterioration of acceleration performance, such as slowness at the time of starting, can be suppressed.

DESCRIPTION OF EMBODIMENTS

Embodiments of the present invention will now be described with reference to the drawings.

First Embodiment

Configuration

First, a configuration according to an embodiment of the present invention will be described.

Figure 1:
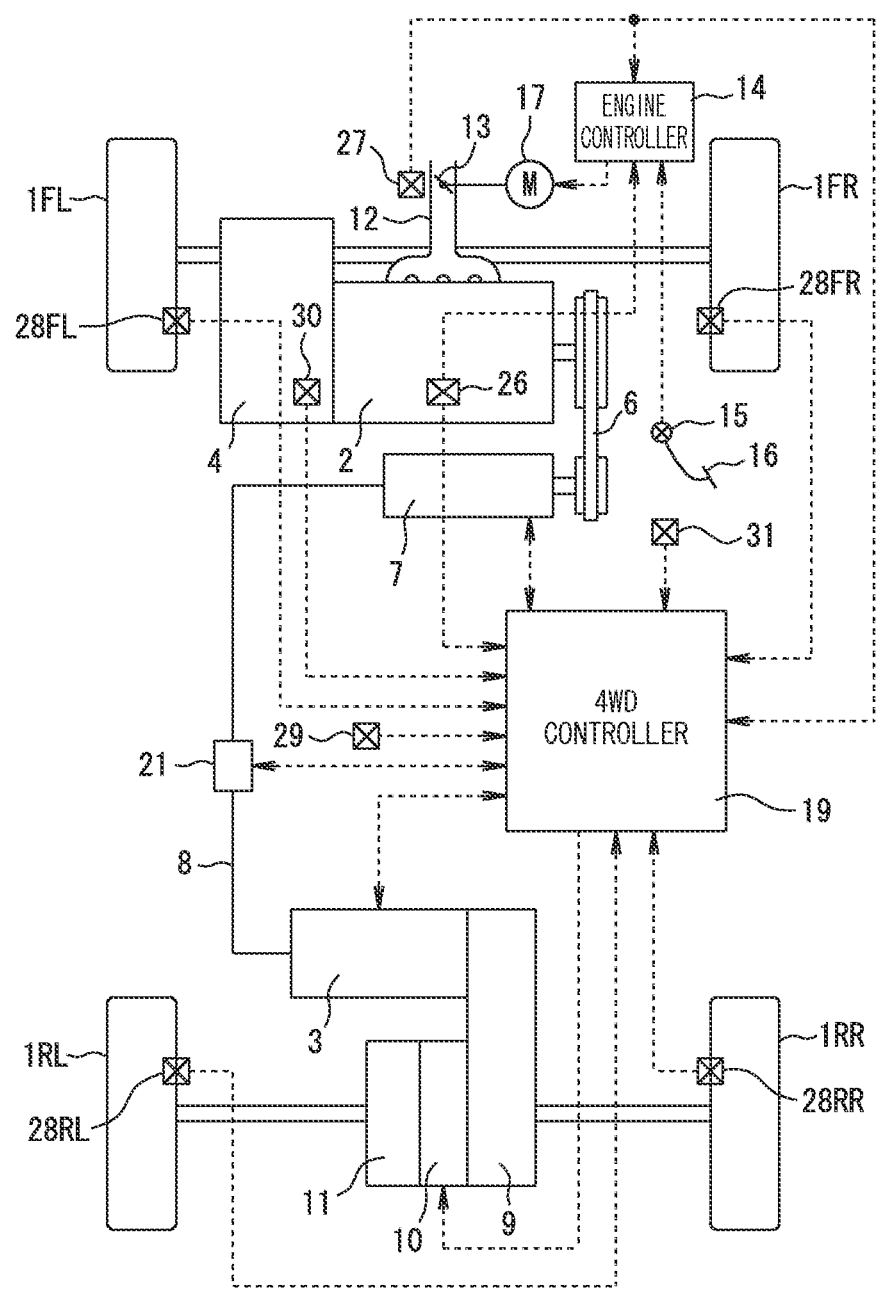
FIG. 1 is an entire configuration view of a vehicle drive control apparatus.

FIG. 1 is an entire configuration view of a vehicle drive control apparatus.

Figure 2:
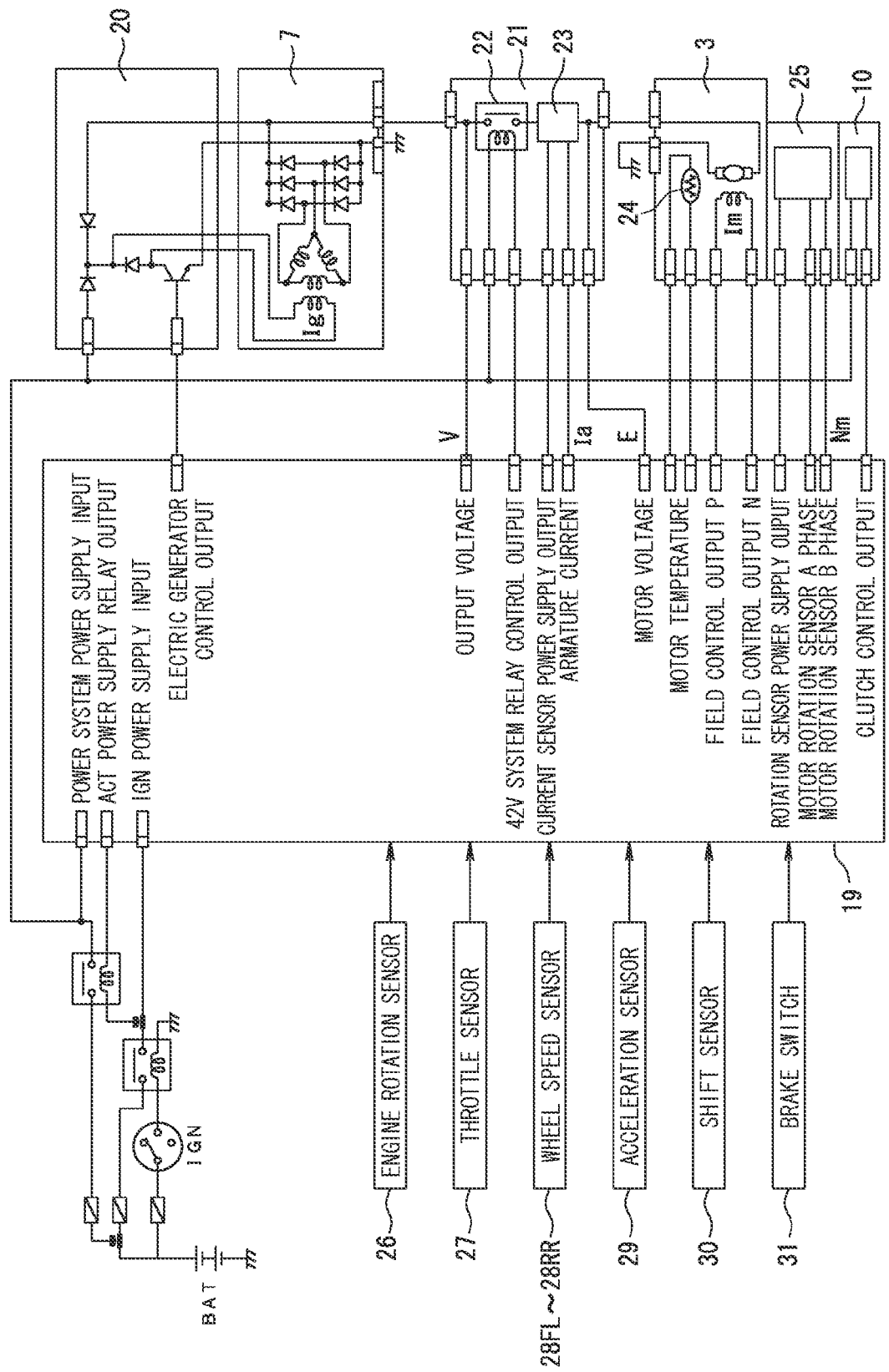
FIG. 2 is a system configuration view of the vehicle drive control apparatus.

FIG. 2 is a system configuration view of the vehicle drive control apparatus.

A vehicle according to an embodiment of the present invention is a so-called standby type four-wheel drive vehicle, where front wheels 1FL and 1FR serve as main drive wheels driven by an engine 2 and rear wheels 1RL and 1RR serve as auxiliary drive wheels that can be driven by an electric motor 3.

An output from the engine 2 is transmitted to the front wheels 1FL and 1FR through an automatic transaxle 4 having a torque converter, and in addition, is transmitted to a generator 7 through a V belt 6. The generator 7 generates electric power with the power transmitted through the V belt 6, and the generated electric power is directly supplied to the electric motor 3 through a power cable 8. An output from the electric motor 3 is transmitted to the rear wheels 1RL and 1RR through a decelerator 9, an electromagnetic clutch 10 (clutch), and a differential gear 11 in this order.

Here, the output of the engine 2 is controlled by an engine controller 14 for controlling an opening degree of a throttle valve 13 provided at an intake pipe passage 12 (e.g., an intake manifold). Specifically, a rotation angle of a throttle motor 17 connected to the throttle valve 13 is controlled in response to an operation amount of an accelerator pedal 16 to be detected by an accelerator sensor 15.

Further, as illustrated in FIG. 2, the generator 7 includes a transistor type regulator 20 for regulating a generation voltage V. Since the regulator 20 controls field current Ig according to a power generation controlling instruction from a 4WD controller 19, the generation voltage V of the generator 7 is controlled.

Moreover, a main relay 22 and a current sensor 23 are provided in a junction box 21 arranged in a partway of the power cable 8. The main relay 22 performs ON/OFF of electric power supplied to the electric motor 3 according to a relay controlling instruction from the 4WD controller 19. The current sensor 23 detects an armature current Ia to be energized to the electric motor 3, and outputs the current to the 4WD controller 19. Further, in the junction box 21, the generation voltage V by the generator 7 and motor induction voltage E are detected by an incorporated monitor circuit, and are then output to the 4WD controller 19.

Additionally, the electric motor 3 is configured with, for example, a separately excited DC motor, and a drive torque Tm is controlled by controlling a field current Im according to a motor controlling instruction form the 4WD controller 19. Further, in the electric motor 3, a motor temperature is detected by an incorporated thermistor 24, and a motor speed Nm is detected by a motor rotation sensor 25. Each detected signal is output to the 4WD controller 19.

Moreover, the electromagnetic clutch 10 is configured with a wet multiple disc type clutch. By controlling distribution of excitation current according to a clutch controlling instruction from the 4WD controller 19, connection and disconnection of a power transmission path is controlled.

Each detection signal of an engine rotation sensor 26, a throttle sensor 27, wheel speed sensors 28FL to 28RR, an acceleration sensor 29, a shift sensor 30, and a brake switch 31 is input to the 4WD controller 19.

The engine rotation sensor 26 detects an engine speed Ne. In this engine rotation sensor 26, for example, magnetic lines of force of a sensor rotor are detected by a detection circuit, a change of a magnetic field accompanying the rotation of the sensor rotor is converted into a current signal, and the signal is input to the 4WD controller 19. The 4WD controller 26 determines the engine speed Ne from the input current signal.

The throttle sensor 27 detects an opening degree of a throttle valve (an opening degree of an accelerator pedal) Acc of the throttle valve 13. The throttle sensor 27, for example, is a potentiometer, and converts the opening degree of a throttle valve of the throttle valve 13 into a voltage signal and inputs the voltage signal to the 4WD controller 19. The 4WD controller 19 determines the opening degree of the throttle valve Acc of the throttle valve 13 from the input voltage signal.

The wheel speed sensor 28 detects wheel speeds $Vw_{FL}$ to $Vw_{RR}$ of the respective wheels. In the wheel speed sensor 28, for example, magnetic lines of force of a sensor rotor are detected by a detection circuit. A change of a magnetic field accompanying the rotation of the sensor rotor is converted into a current signal, and the current signal is input to the 4WD controller 19. The 4WD controller 19 determines the wheel speeds $Vw_{FL}$ to $Vw_{RR}$ from the input current signal.

The acceleration sensor 29 detects a degree of acceleration/deceleration in a vehicle longitudinal direction. The acceleration sensor 29, for example, detects position displacement of a movable electrode with respect to a fixed electrode, as a change of electrostatic capacity. The acceleration sensor 29 converts the position displacement into a voltage signal proportional to the degree of acceleration/deceleration and the direction, and outputs the voltage signal to the 4WD controller 19. The 4WD controller 19 determines the degree of acceleration/deceleration from the input voltage signal.

The shift sensor 30 detects a shift position of a transmission. The shift sensor 30, for example, includes a plurality of hall elements, and inputs each ON/OFF signal to the 4WD controller 19. The 4WD controller 19 determines the shift position from a combination of the ON/OFF signals.

The brake switch 31 detects ON/OFF of a brake. The brake switch 31 inputs a voltage signal according to the ON/OFF of the brake to the 4WD controller 19 through, for example, a detection circuit having normally closed contacts. The 4WD controller 19 determines the ON/OFF of the brake from the input voltage signal.

It should be noted that the 4WD controller 19 inputs the respective detection signals from sensors and switches, however, the present invention is not limited to this. The 4WD controller 19 may be connected to another control units through a twisted pair line, and receive various data through, for example, multiplex communication of CSMA/CA system (CAN: Controller Area Network).

Next, an operation process to be performed by the 4WD controller 19 will be described.

Figure 3:
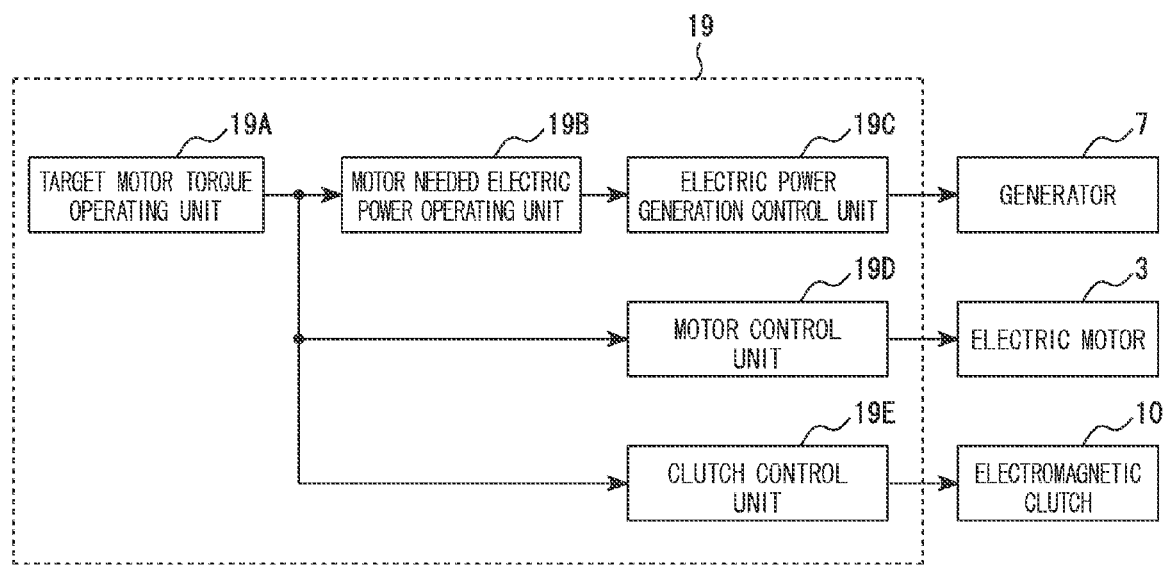
FIG. 3 is a block diagram of an operation process to be performed by a 4WD controller 19.

FIG. 3 is a block diagram of the operation process to be performed by the 4WD controller 19.

The 4WD controller 19 includes a target motor torque operating unit 19A, a motor needed electric power operating unit 19B, an electric power generation control unit 19C, and a motor control unit 19D. It should be noted that detailed descriptions of controlling of the main relay and the electromagnetic clutch 10 are omitted. However, it is assumed that when controlling the driving of the electric motor 3, the 4WD controller 19 outputs the relay controlling instruction to the main relay, and controls the electric power supplied to the electric motor 3 to an ON state. Also, the 4WD controller 19 outputs the clutch controlling instruction to the electromagnetic clutch 10, and controls the electromagnetic clutch 10 to a fastened state.

First, operating process to be performed by the target motor torque operating unit 19A will be described.

Figure 4:
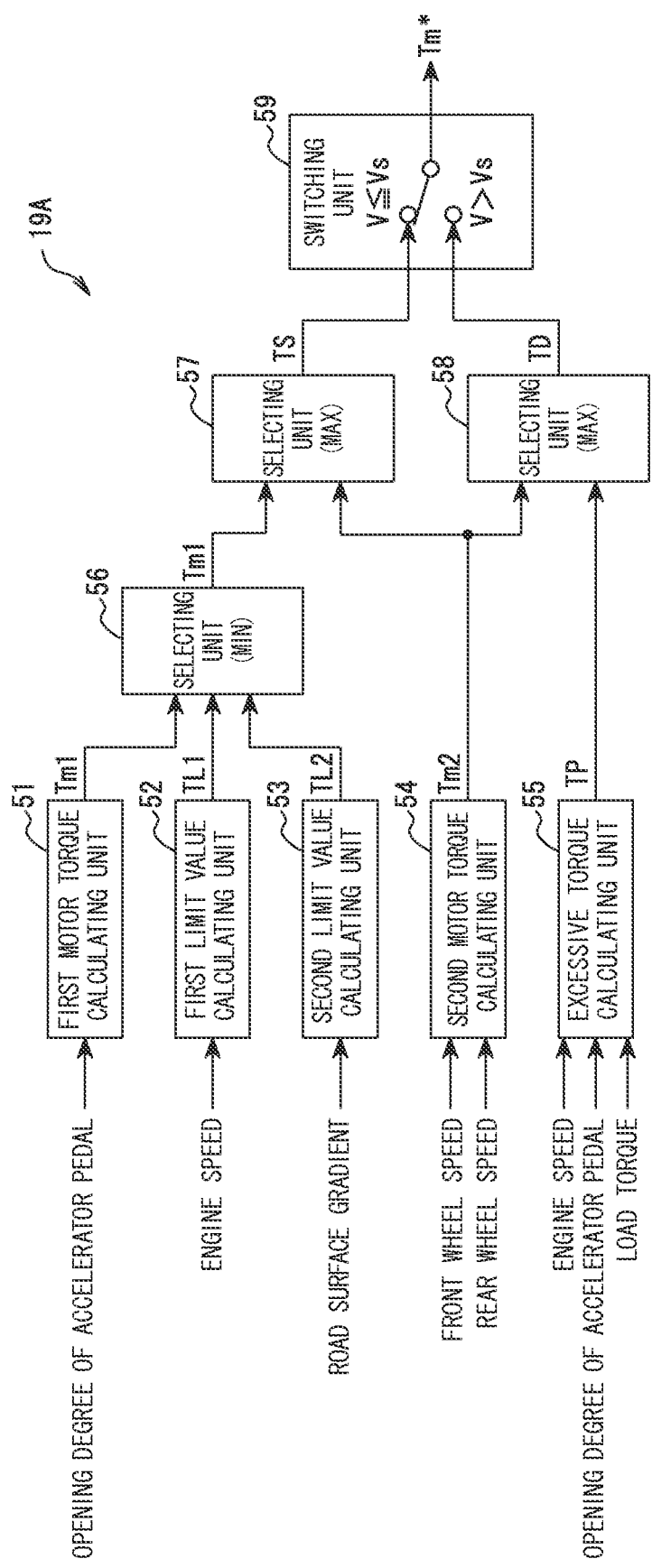
FIG. 4 is a block diagram of a target motor torque operating unit 19A.

FIG. 4 is a block diagram of the target motor torque operating unit 19A.

The target motor torque operating unit 19A includes a first motor torque calculating unit 51, a first limit value calculating unit 52, a second limit value calculating unit 53, a second motor torque calculating unit 54, an excessive torque calculating unit 55, a selecting unit 56, a selecting unit 57, a selecting unit 58, and a switching unit 59.

First, a first motor torque calculation process to be performed by the first motor torque calculating unit 51 will be described.

Figure 5:
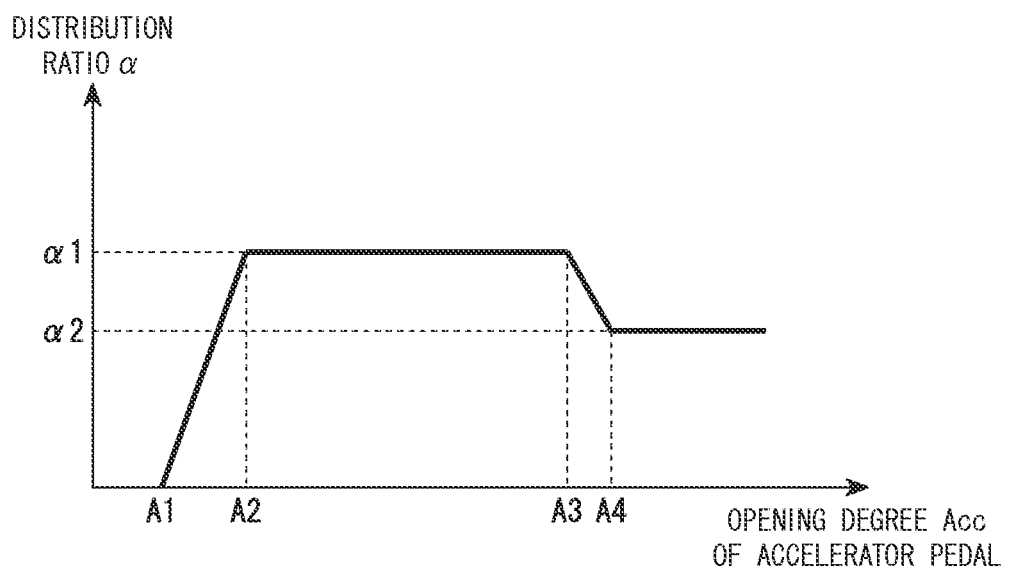
FIG. 5 is a map used for calculation of a power distribution ratio α according to an opening degree Acc of an accelerator pedal.

In the first motor torque calculating unit 51, referring to a map in FIG. 5, a power distribution ratio α is calculated from the opening degree Acc of the accelerator pedal, and a first motor torque Tm1 according to the power distribution ratio α is calculated. Here, the power distribution ratio α is a ratio for distributing the power from the engine 2 to the electric motor 3 at the time of converting the power of the engine 2 into the power of the electric motor 3.

FIG. 5 is the map used for calculation of the power distribution ratio α according to the opening degree Acc of the accelerator pedal.

In this map, regarding the opening degree Acc of the accelerator pedal, A1 to A4 having a relationship of 0<A1<A2<A3<A4 are determined in advance, and regarding the power distribution ratio, α1 (e.g., 20%), α2 (e.g., 12%) having a relationship of α1>α2 are determined in advance. Then, when the opening degree Acc of the accelerator pedal falls within a range from 0 to A1, the power distribution ratio α is maintained at 0. When the opening degree Acc of the accelerator pedal falls within a range from A1 to A2, as the opening degree Acc of the accelerator pedal is larger, the power distribution ratio α is increased from 0 to α1. Further, when the opening degree Acc of the accelerator pedal falls within a range from A2 to A3, the power distribution ratio α is maintained at α1. When the opening degree Acc of the accelerator pedal falls within a range from A3 to A4, as the opening degree Acc of the accelerator pedal is larger, the power distribution ratio α is decreased from α1 to α2. Moreover, when the opening degree Acc of the accelerator pedal is larger than A4 the power distribution ratio α is maintained at α2.

Next, a first limit value calculation process to be performed by the first limit value calculating unit 52 will be described.

Figure 6:
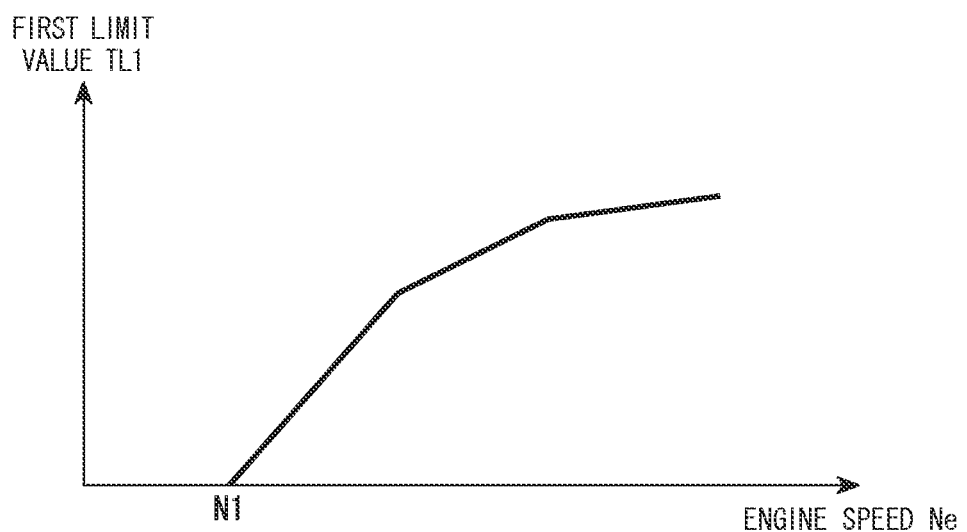
FIG. 6 is a map used for calculation of a first limit value TL1.

In the first limit value calculating unit 52, referring to a map in FIG. 6, a first limit value TL1 is calculated from the engine speed Ne.

FIG. 6 is a map used for calculation of the first limit value TL1.

In this map, regarding the engine speed Ne, N1 having a relationship of 0<N1 is determined in advance. Then, when the engine speed Ne falls within a range from 0 to N1, the first limit value TL1 is maintained at 0. When the engine speed Ne is larger than N1, as the engine speed Ne is larger, the first limit value TL1 is increased from 0.

Next, a second limit value calculation process to be performed by the second limit value calculating unit 53 will be described.

Figure 7:
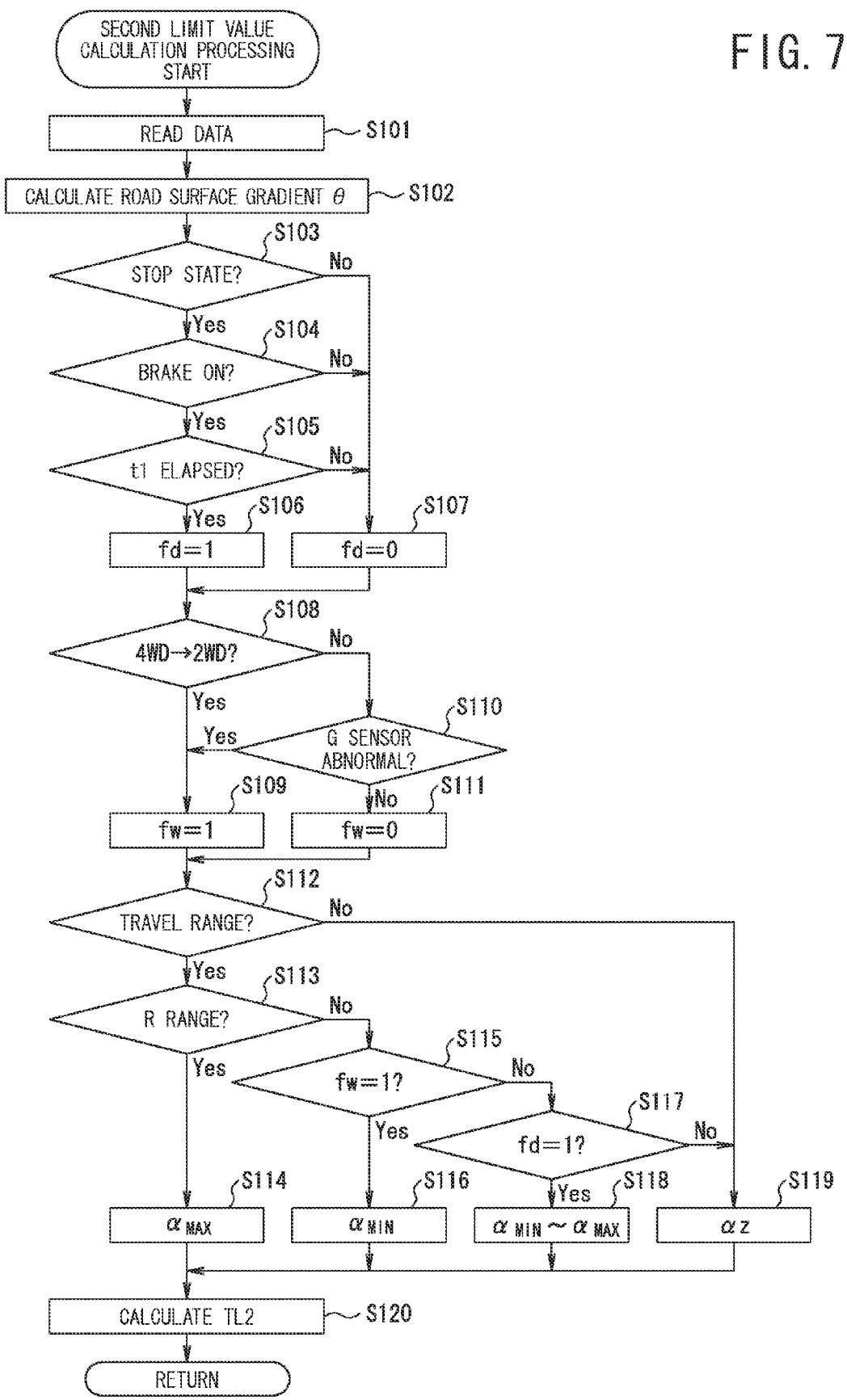
FIG. 7 is a flowchart illustrative of a second limit value calculation process.

In the second limit value calculating unit 53, the second limit value calculation process in FIG. 7 is performed at every predetermined time (e.g., 10 msec).

FIG. 7 is a flowchart illustrative of the second limit value calculation process.

In step S101, various data is read, and then the process proceeds to step S102.

In step S102, a road surface gradient θ% is calculated according to the degree of acceleration/deceleration, and then the process proceeds to step S103. It should be noted that the road surface gradient θ is calculated as (vertical distance/horizontal distance)×100, where an upward slope side is expressed by a positive value (+), and a downward slope side is expressed by a negative value (−). The road surface gradient θ is subjected to, for example, a low-pass filter process of 1 Hz.

In step S103, a determination is made as to whether or not the vehicle is in a stop state. Here, it is determined whether or not a vehicle velocity V is 0. Here, when the vehicle velocity V is 0, it is determined that the vehicle is in the stop state, and the process proceeds to step S104. On the other hand, when the vehicle velocity V is larger than 0, it is determined that the vehicle is in a travel state, and the process proceeds to step S107.

In step S104, a determination is made as to whether or not the brake is turned ON. Here, when the brake is turned ON, it is determined that the vehicle is in a braking state, and the process proceeds to step S105. On the other hand, when the brake is turned OFF, it is determined that the vehicle is not in the braking state, and the process proceeds to step S107.

In step S105, a determination is made as to whether or not a predetermined time t1 (e.g., 1 sec) has elapsed since the vehicle is in a stop state and in a braking state. Here, when the t1 has elapsed, it is determined that the road surface gradient θ during the vehicle stops is detectable, and the process proceeds to step S106. On the other hand, when the t1 has not elapsed, it is determined that the road surface gradient θ during the vehicle stops is undetectable, and the process proceeds to step S107.

In step S106, a detection flag is set to 1 (fd=1), and then the process proceeds to step S108.

In step S107, a detection flag is set to 0 (fd=0), and then the process proceeds to step S108.

In step S108, a determination is made as to whether or not it is immediately after setting is switched from the four wheel drive to a two wheel drive. Here, a determination is made as to whether or not the vehicle is set to the four wheel drive in the previous operation and is set to the two wheel drive in the current operation. Here, when it is immediately after the setting is switched to the two wheel drive, the process proceeds to step S109. On the other hand, when the vehicle is still set to the four wheel drive or maintains a state set to the two wheel drive, the process proceeds to step S110.

In step S109, a withdrawal flag is set to 1 (fw=1), and then the process proceeds to step S112.

In step S110, a determination is made as to whether or not the acceleration sensor 29 has abnormality. Here, when the acceleration sensor 29 has abnormality, the process proceeds to the above-described step S109. On the other hand, when the acceleration sensor 29 is normal, the process proceeds to step S111.

In step S111, the withdrawal flag fw is reset to 0 (fw=0), and then the process proceeds to step S112.

In step S112, a determination is made as to whether or not the shift position of the transmission is set to a travel range. Here, when the shift position is set to the travel range, such as a forward range (D or first speed) or a rearward range (R), the process proceeds to step S113. On the other hand, when the shift position is not set to the travel range, such as the forward range (D or first speed) or the rearward range (R), that is, is set to a parking range (P), a neutral range (N), or the like, the process proceeds to step S119.

In step S113, a determination is made as to whether or not the shift position of the transmission is set to the rearward range (R). Here, when the shift position is set to the rearward range (R), the process proceeds to step S114. On the other hand, when the shift position is not set to the rearward range (R), that is, is set to the forward range (D or first speed), the process proceeds to step S115.

In step S114, the power distribution ratio α is set to a predetermined maximum value $α_{MAX}$ (e.g., 20%), and then the process proceeds to step S120.

In step S115, a determination is made as to whether or not the withdrawal flag fw is set to 1 (fw=1). Here, when the withdrawal flag fw is set 1 (fw=1), the process proceeds to step S116. On the other hand, when the withdrawal flag fw is reset to 0 (fw=0), the process proceeds to step S117.

In step S116, the power distribution ratio α is set to a predetermined minimum value $α_{MIN}$ (e.g., 5%), and then the process proceeds to step S120.

In step S117, a determination is made as to whether or not the detection flag fd is set to 1 (fd=1). Here, when the detection flag fd is set to 1 (fd=1), the process proceeds to step S118. On the other hand, when the detection flag fd is reset to 0 (fd=0), the process proceeds to step S119.

Figure 8:
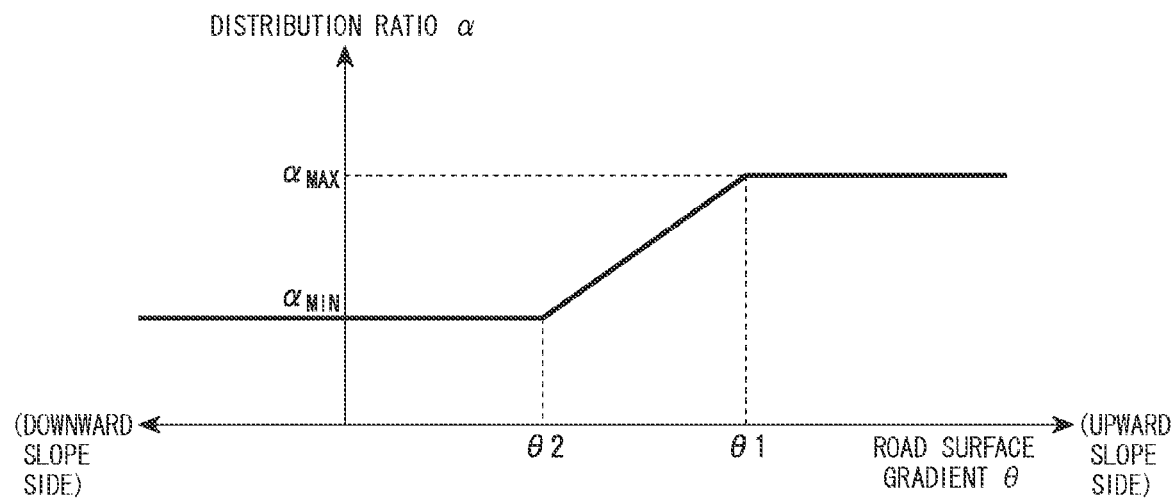
FIG. 8 is a map used for setting of a power distribution ratio α according to a road surface gradient θ.

In step S118, referring to a map in FIG. 8, the power distribution ratio α is set according to the road surface gradient θ, and then the process proceeds to step S120.

FIG. 8 is the map used for setting of the power distribution ratio α according to the road surface gradient θ.

In this map, regarding the road surface gradient θ, θ2 (e.g., 10%), θ1 (e.g., 15%) having a relationship of 0<θ2<θ1 on the upward slope side (positive side) are determined in advance. Then, when the road surface gradient θ falls within a range from 0 to θ2, the power distribution ratio α is maintained at the minimum value $α_{MIN}$. When the road surface gradient θ falls within a range from θ2 to θ1, as the road surface gradient θ is larger, the power distribution ratio α is increased from the minimum value $α_{MIN}$ to the maximum value $α_{MAX}$. When the road surface gradient θ is larger than θ1, the power distribution ratio α is maintained at the maximum value $α_{MAX}$. It should be noted that when the road surface gradient θ is on the downward slope side (negative side), the power distribution ratio α is maintained at the minimum value $α_{MIN}$.

In step S119, the power distribution ratio α is set to a previous value αz, and then the process proceeds to step S120.

In step S120, a second limit value TL2 according to the power distribution ratio α is calculated, and then the process returns to a predetermined main program.

Next, a second motor torque operation process to be performed by the second motor torque calculating unit 54 will be described.

Figure 9:
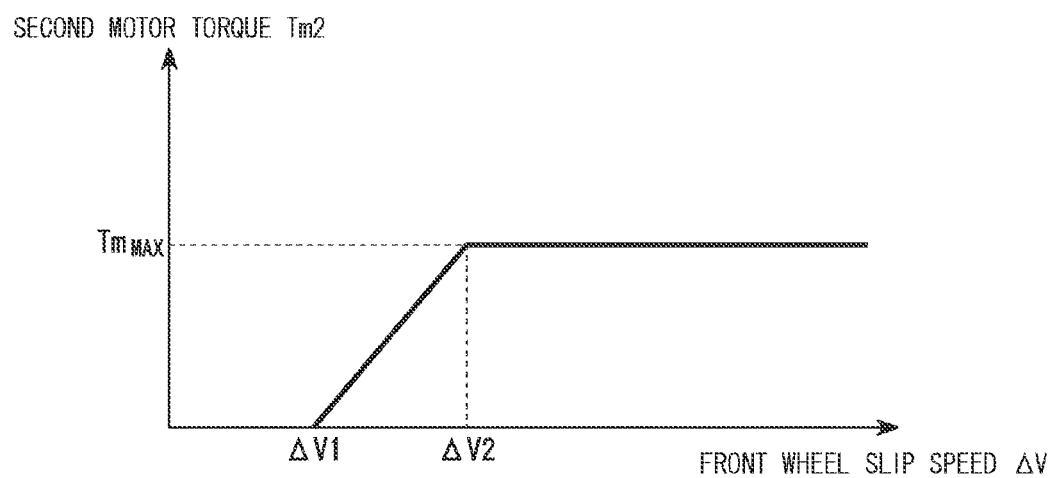
FIG. 9 is a map used for calculation of a second motor torque Tm2.

In the second motor torque calculating unit 54, referring to a map in FIG. 9, a second motor torque Tm2 is calculated from a front wheel slip speed ΔV. Here, as indicated in the following expression (1), for example, the front wheel slip speed ΔV is calculated by subtracting an average wheel speed Vwr of the rear wheels 1RL and 1RR from an average wheel speed Vwf of the front wheels 1FL and 1FR.

$$Vwf=(Vw_{FL}+Vw_{FR})/2$$

$$Vwr=(Vw_{RL}+Vw_{RR})/2$$

$$ΔV=Vwf-Vwr \quad (1)$$

FIG. 9 is the map used for calculation of the second motor torque Tm2.

In this map, regarding the front wheel slip speed ΔV, ΔV1, ΔV2 having a relationship of 0<ΔV1<ΔV2 are determined in advance, and regarding the second motor torque Tm2, a maximum value $T_{MAX}$ having a relationship of $0<T_{MAX}$ is determined in advance. Then, when the front wheel slip speed ΔV falls within a range from 0 to ΔV1, the second motor torque Tm2 is maintained at 0. When the front wheel slip speed ΔV falls within a range from ΔV1 to ΔV2, as the front wheel slip speed ΔV is larger, the second motor torque Tm2 is increased from 0 to the maximum value $T_{MAX}$. Further, when the front wheel slip speed ΔV is larger than ΔV2, the second motor torque Tm2 is maintained at the maximum value $T_{MAX}$.

Next, an excessive torque calculating process to be performed by the excessive torque calculating unit 55 will be described.

Figure 10:
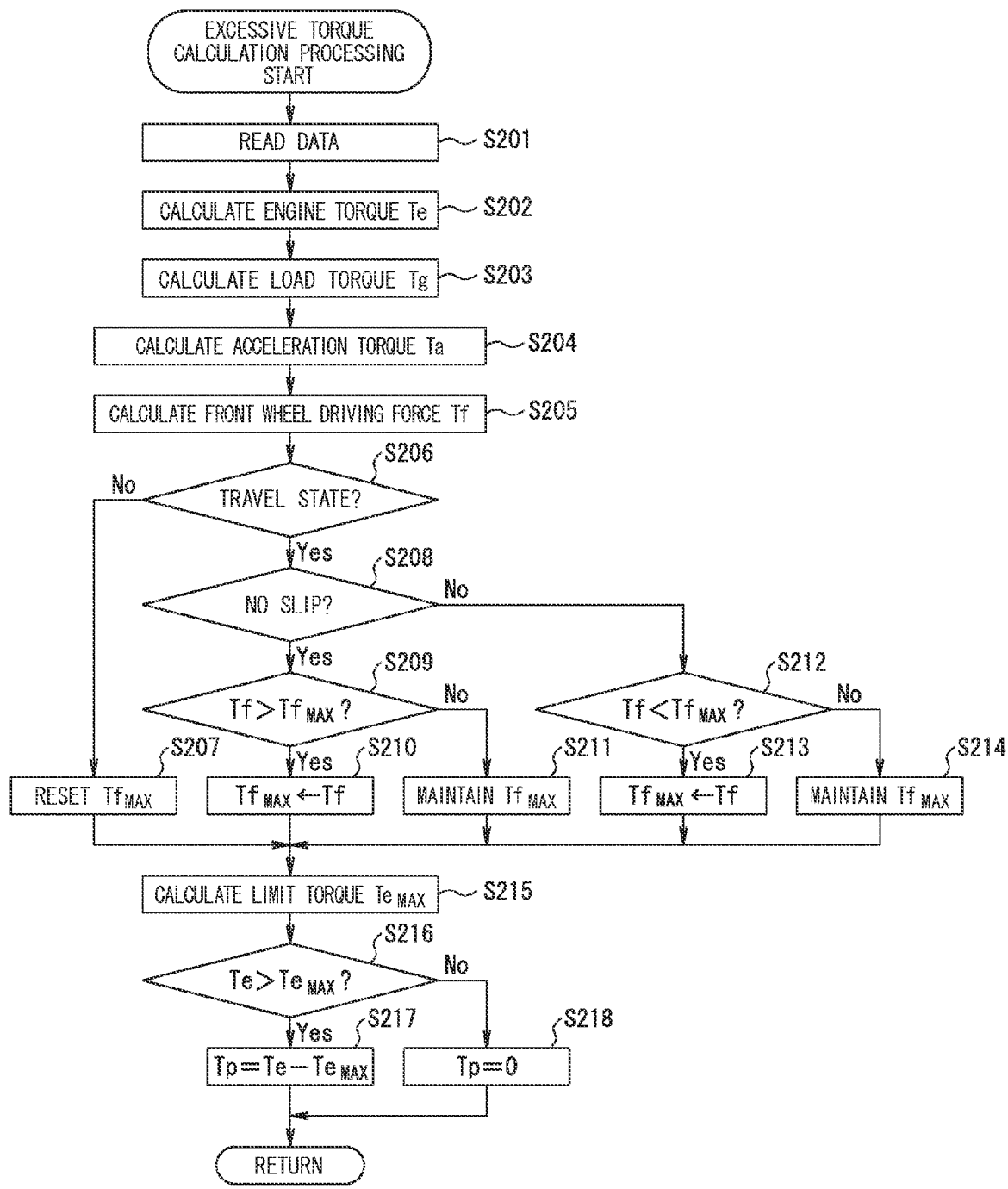
FIG. 10 is a flowchart illustrative of an excessive torque calculation process.

In the excessive torque calculating unit 55, the excessive torque calculation process in FIG. 10 is performed at every predetermined time (e.g., 10 msec).

FIG. 10 is a flowchart illustrative of the excessive torque calculation process.

In step S201, various data is read, and then the process proceeds step S202.

Figure 11:
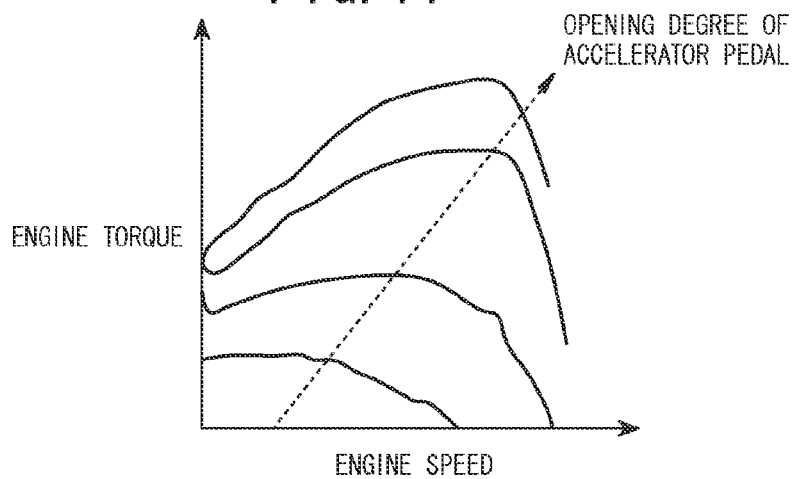
FIG. 11 is a map used for calculation of an engine torque Te.

In step S202, referring to a map in FIG. 11, engine torque Te is calculated (i.e., estimated) according to the engine speed Ne and the opening degree Acc of the accelerator pedal, and then the process proceeds to step S203.

FIG. 11 is the map used for calculation of the engine torque Te.

In this map, the larger the opening degree Acc of the accelerator pedal, the larger the engine torque Te. Then, in an area where the opening degree Acc of the accelerator pedal is relatively small, the engine torque Te is decreased according to the increase of the engine speed Ne. Further, in an area where the opening degree Acc of the accelerator pedal is relatively large, the engine torque Te is firstly increased according to the increase of the engine speed Ne, and is rapidly decreased from a certain position.

In step S203, as indicated in the following expression (2), a load torque Tg of the generator 7 is calculated according to the voltage V, the armature current Ia, and a speed Ng of the generator 7, and then the process proceeds to step S204. Here, K2 and K3 are predetermined coefficients.

$$Tg=K2×(V×Ia)/(K3×Ng) \quad (2)$$

In step S204, as indicated in the following expression (3), an acceleration torque Ta of the front wheels is calculated according to a moment of inertia J and an angular acceleration a, and then the process proceeds to step S205. Here, the moment of inertia J is inertia of a drive system including a gear ratio. It should be noted that the angular acceleration a is obtained from the wheel speeds $Vw_{FL}$ and $Vw_{FR}$ of the front wheels.

$$Ta=J×a \quad (3)$$

In step S205, as indicated in the following expression (4), a front wheel driving force Tf is calculated according to the engine torque Te, the load torque Tg, and the acceleration torque Ta, and then the process proceeds to step S206. Here, Rt is an amplification ratio of the torque converter, and Rg is a gear ratio of the transmission. It should be noted that the front wheel driving force Tf corresponds to a road surface reaction force relative to the front wheels 1FL and 1FR.

$$Tf=(Te-Tg)×(Rt×Rg)-Ta \quad (4)$$

In step S206, a determination is made as to whether or not the vehicle is in a travel state. Here, a determination is made as to whether or not the vehicle velocity V is larger than 0. Here, when the vehicle velocity V is 0, it is determined that the vehicle is not in the travel state, that is, in a stop state, and the process proceeds to step S207. On the other hand, when the vehicle velocity V is larger than 0, it is determined that the vehicle is in the travel state, and the process proceeds to step S208.

In step S207, a stored maximum value $Tf_{MAX}$ is reset to 0, and then the process proceeds to step S215.

In step S208, a determination is made as to whether or not the front wheel has a slipping tendency. Here, a determination is made as to whether or not the front wheel slip speed ΔV is less than a predetermined threshold value th. Here, when the front wheel slip speed ΔV is less than the predetermined threshold value th, it is determined that the front wheel does not have the slipping tendency, and the process proceeds to step S209. On the other hand, when the front wheel slip speed ΔV is more than or equal to the predetermined threshold value th, it is determined that the front wheel has the slipping tendency, and the process proceeds to step S212.

In step S209, a determination is made as to whether or not the front wheel driving force Tf is larger than the stored maximum value $Tf_{MAX}$. Here, when the front wheel driving force Tf is larger than the maximum value $Tf_{MAX}$, it is determined that update of the maximum value $Tf_{MAX}$ is needed, and the process proceeds to step S210. On the other hand, when the front wheel driving force Tf is smaller than or equal to the maximum value $Tf_{MAX}$, it is determined that the update of the maximum value $Tf_{MAX}$ is not needed, and the process proceeds to step S211.

In step S210, the stored maximum value $Tf_{MAX}$ is updated to a current front wheel driving force Tf, and then the process proceeds to step S215.

In step S211, the stored maximum value $Tf_{MAX}$ is maintained, and the process proceeds to step S215.

In step S212, a determination is made as to whether or not the front wheel driving force Tf is smaller than the maximum value $Tf_{MAX}$. Here, when the front wheel driving force Tf is smaller than the maximum value $Tf_{MAX}$, it is determined that update of the maximum value $Tf_{MAX}$ is needed, and the process proceeds to step S213. On the other hand, when the front wheel driving force Tf is larger than or equal to the maximum value $Tf_{MAX}$, it is determined that the update of the maximum value $Tf_{MAX}$ is not needed, and the process proceeds to step S214.

In step S213, the stored maximum value $Tf_{MAX}$ is updated to the current front wheel driving force Tf, and then the process proceeds to step S215.

In step S214, the stored maximum value $Tf_{MAX}$ is maintained, and the process proceeds to step S215.

In step S215, as indicated in the following expression (5), a limit torque $Te_{MAX}$ to the engine torque Te is calculated according to the stored maximum value $Tf_{MAX}$, and then the process proceeds to step S216. Here, Rt is an amplification ratio of the torque converter, and Rg is a gear ratio of the transmission. It should be noted that the limit torque $Te_{MAX}$ corresponds to an upper limit value capable of suppressing acceleration slip of the front wheels 1FL and 1FR.

$$Te_{MAX}=Tf_{MAX}/(Rt \times Rg) \quad (5)$$

In step S216, a determination is made as to whether or not the engine torque Te is larger than the limit torque $Te_{MAX}$. Here, when the engine torque Te is larger than the limit torque $Te_{MAX}$, it is determined that the engine torque Te has an excessive torque Tp, and the process proceeds to step S217. On the other hand, when the engine torque Te is smaller than or equal to the limit torque $Te_{MAX}$, it is determined that engine torque Te does not have the excessive torque Tp, and the process proceeds to step S218.

In step S217, as indicated in the following expression (6), the excessive torque Tp is calculated by subtracting the limit torque $Te_{MAX}$ from the engine torque Te, and then the process returns to the predetermined main program.

$$Tp=Te-Te_{MAX} \quad (6)$$

In step S218, the excessive torque Tp is reset to 0, and then the process returns to the predetermined main program.

Next, a selection process to be performed by the selecting unit 56 will be described.

In the selecting unit 56, as indicated in the following expression (7), the smallest one of the first motor torque Tm1, the first limit value TL1, and the second limit value TL2 is calculated as a new first motor torque Tm1.

$$Tm1=\min[Tm1,TL1,TL2] \quad (7)$$

Next, the selection process to be performed by the selecting unit 57 will be described.

In the selecting unit 57, as indicated in the following expression (8), the larger one of the first motor torque Tm1 and the second motor torque Tm2 is calculated as a starting motor torque TS.

$$TS=\max[Tm1,Tm2] \quad (8)$$

Next, the selection process to be performed by the selecting unit 58 will be described.

In the selecting unit 58, as indicated in the following expression (9), the largest one of the second motor torque Tm2 and the excessive torque Tp is calculated as a traveling motor torque TD.

$$TD=\max[Tm2,Tp] \quad (9)$$

Next, a switching process to be performed by the switching unit 59 will be described.

In the switching unit 59, a determination is made as to whether or not the vehicle velocity V is less than or equal to a predetermined threshold value Vs (e.g., 5 km/h). Here, when the vehicle velocity V is less than or equal to the threshold value Vs, the starting motor torque TS is output as a final target motor torque Tm*. On the other hand, when the vehicle velocity V is larger than the threshold value Vs, the traveling motor torque TD is output as the final target motor torque Tm*.

Next, an operation process to be performed by the motor needed electric power operating unit 19B will be described.

In the motor needed electric power operating unit 19B, as indicated in the following expression (10), a motor needed electric power Pm* to be needed by the electric motor 3 is calculated according to the target motor torque Tm* and the motor speed Nm.

$$Pm^*=Tm^* \times Nm \quad (10)$$

Next, the operation process to be performed by the electric power generation control unit 19C will be described.

Figure 12:
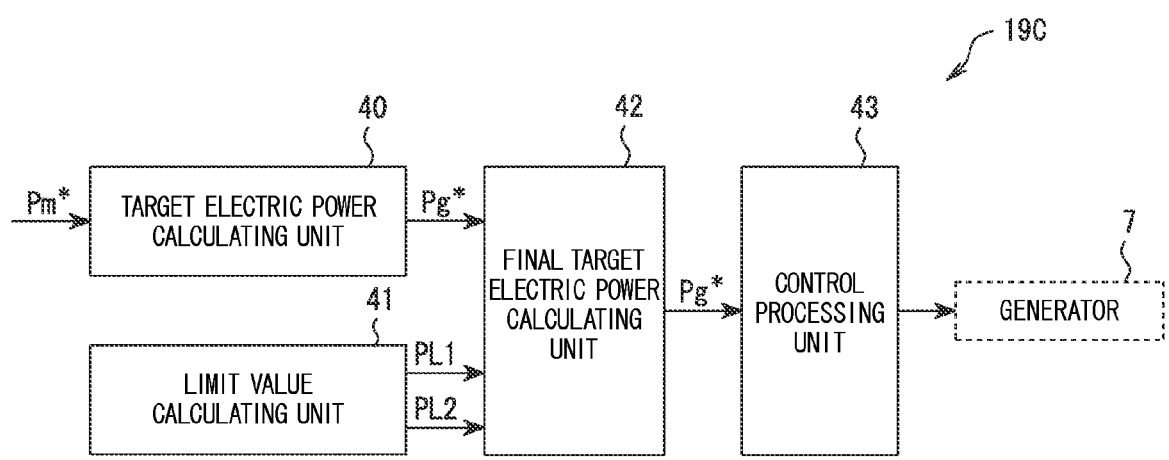
FIG. 12 is a block diagram of an electric power generation control unit 19C.

FIG. 12 is a block diagram of the electric power generation control unit 19C.

The electric power generation control unit 19C includes a target electric power calculating unit 40, a limit value calculating unit 41, a final target electric power calculating unit 42, and a control processing unit 43.

First, an operation process to be performed by the target electric power calculating unit 40 will be described.

In the target electric power calculating unit 40, as indicated in the following formula (11), a target electric power Pg*, from which the generator 7 should output, is calculated according to the motor needed electric power Pm* and a motor efficiency ηm.

$$Pg^*=Pm^*/\eta m \quad (11)$$

Next, the operation process to be performed by the limit value calculating unit 41 will be described.

In the limit value calculating unit 41, limit values PL1 and PL2 to an output electric power are calculated.

Here, the limit value PL1 is an upper limit value capable of suppressing a belt slip of the V belt 6. As indicated in the following expression (12), the limit value PL1 is calculated according to a torque upper limit TL, a generator speed Ng, and a generator efficiency ηg, to which the V belt 6 is transmittable.

$$PL1 = TL \times Ng \times \eta g \quad (12)$$

Further, the limit value PL2 is an upper limit value capable of suppressing an engine stall caused by overload on the engine 2 and deterioration of operability. The limit value PL2 may be calculated according to the engine speed Ne or may be a predetermined value.

Next, an operation process to be performed by the final target electric power calculating unit 42 will be described.

In the final target electric power calculating unit 42, as indicated in the following expression (13), the smallest one of the target electric power Pg*, the limit values PL1 and PL2 is calculated as a final target electric power Pg*.

$$Pg^* = \min[Pg^*, PL1, PL2] \quad (13)$$

Next, the operation process to be performed by the control processing unit 43 will be described.

In the control processing unit 43, the field current Ig of the generator 7 is controlled in such a manner that the target electric power Pg* is output from the generator 7. Here, the field current Ig is controlled by a feedback control in such a manner that the target electric power Pg* and an actual output electric power Pg coincide with each other.

Figure 13:
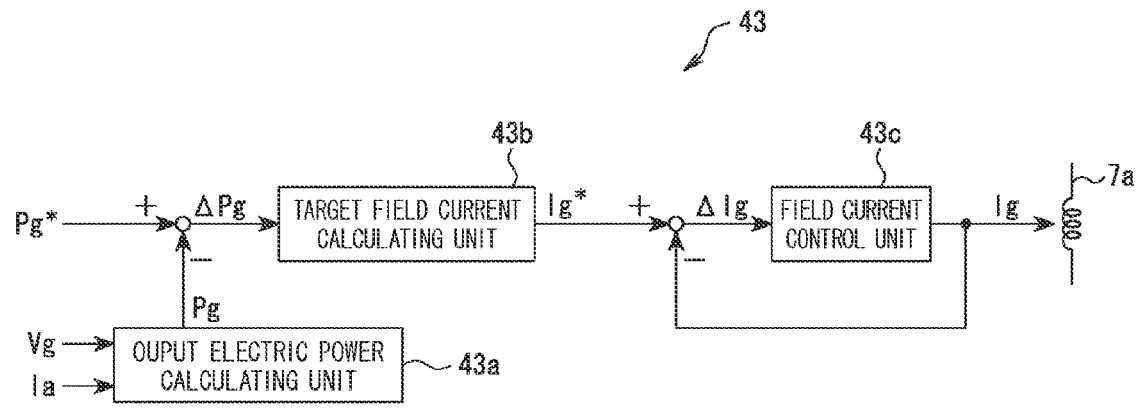
FIG. 13 is a block diagram of a control processing unit 43.

FIG. 13 is a block diagram of the control processing unit 43.

The control processing unit 43 includes an output electric power calculating unit 43a, a target field current calculating unit 43b, and a field current control unit 43c.

First, in the output electric power calculating unit 43a, the actual output electric power Pg (=Vg×Ia) is calculated by multiplying a generator voltage Vg and an energizing current Ia.

Then, in the target field current calculating unit 43b, a target field current Ig* is calculated in such a manner that a deviation ΔPg between the actual output electric power Pg and the target electric power Pg* is 0.

Then, in the field current control unit 44c, the field current Ig flowing in a rotor coil 7a is controlled via an IC regulator in such a manner that a deviation ΔIg between the actual field current Ig and the target field current Ig* is 0. It should be noted that the actual field current Ig is detected by the current sensor.

Next, an operation process to be performed by the motor control unit 19D will be described.

In the motor control unit 19D, first, a target motor field current Im* is calculated from the motor speed Nm. When the motor speed Nm reaches a high velocity range, this target motor field current Im* is reduced by known field weakening control. In other words, when the electric motor 3 rotates at high velocity, induction voltage is increased, and the motor torque Tm is reduced. Accordingly, by reducing the field current Im, the rise of the induction voltage is suppressed, and the reduction of the motor torque Tm is prevented.

Then, the field current Im of the electric motor 3 is regulated to the target motor field current Im* in such a manner that the target motor torque Tm* is output.

Next, an operation process to be performed by a clutch control unit 19E will be described.

In the clutch control unit 19E, when the target motor torque Tm* is 0, power transmission from the electric motor 3 to the rear wheels 1RL and 1RR is interrupted by controlling the electromagnetic clutch 10 to a non-fastened state. When the target motor torque Tm* is larger than 0, the power transmission from the electric motor 3 to the rear wheels 1RL and 1RR is performed by controlling the electromagnetic clutch 10 to a fastened state.

(Operations)

Next, operations according to an embodiment of the present invention will be described.

First, the outline of a four wheel drive travel will be described.

When the accelerator pedal is depressed, or the front wheels 1FL and 1FR are subjected to acceleration slip (idling), the target motor torque Tm* is calculated with an increase in the opening degree Acc of the accelerator pedal and an increase in the front wheel slip speed ΔV. The acceleration slip is caused by a low friction coefficient of the road surface, such as wet road, snow road, or icy road, a large road surface gradient in a vehicle travel direction on the upward slope side, or an excessively large opening degree Acc of the accelerator pedal.

When the target motor torque Tm* is calculated, power generation of the generator 7 starts accordingly. Therefore, if the front wheels 1FL and 1FR have been subjected to the acceleration slip, the output of the engine 2 is suppressed by converting rotational energy lost in the acceleration slip into electric energy, and the acceleration slip of the front wheels 1FL and 1FR can be suppressed.

Further, the electric power generated by the generator 7 is supplied to the electric motor 3, and the rear wheels 1RL and 1RR are driven by this electric motor 3, that is, are in the four wheel drive state. Consequently, not only the energy efficiency is improved, but also smooth and stable start performance and travel performance can be exhibited.

The target motor torque Tm* is mainly calculated based on the first motor torque Tm1 according to the opening degree Acc of the accelerator pedal, the second motor torque Tm2 according to the front wheel slip speed ΔV, and the excessive torque Tp exceeding the limit torque $Te_{MAX}$.

Figure 14:
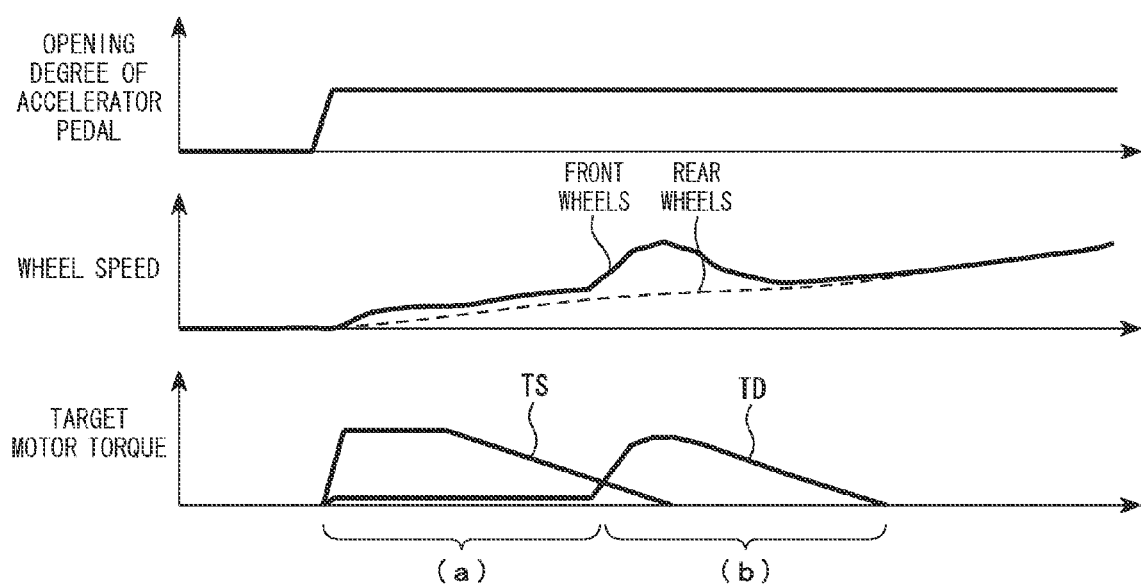
FIG. 14 is a time chart illustrative of a transition of target motor torque Tm*.

FIG. 14 is a time chart illustrative of a transition of the target motor torque Tm*.

First, when the vehicle velocity V is, for example, 5 km/h or less, the starting motor torque TS obtained by select high to select a higher one of the first motor torque Tm1 and the second motor torque Tm2 is output as the final target motor torque Tm*. With such a configuration, if the acceleration slip occurs at the front wheels 1FL and 1FR, the target motor torque Tm* according to the front wheel slip speed ΔV is output. As illustrated in (a) in FIG. 14, even when the acceleration slip does not occur at the front wheels 1FL and 1FR, the target motor torque Tm* according to the opening degree Acc of the accelerator pedal is output. In this way, either an acceleration intention of a driver or a detected acceleration slip state given the higher priority can be reflected on the target motor torque Tm*.

Further, when the vehicle velocity V exceeds, for example, 5 km/h, the traveling motor torque TD obtained by select high to select a higher one of the second motor torque Tm2 and the excessive torque Tp is output as the final target motor torque Tm*. With such a configuration, as illustrated in (b) in FIG. 14, if the acceleration slip occurs at the front wheels 1FL and 1FR, the target motor torque Tm* according to the front wheel slip speed ΔV is output. Even when the acceleration slip does not yet occur at the front wheels 1FL and 1FR, the target motor torque Tm* according to the excessive torque Tp estimated to exceed the limit torque $Te_{MAX}$ is output. In this way, a detected acceleration slip state or an acceleration slipping tendency to be estimated given the higher priority can be reflected on the target motor torque Tm*.

When the excessive torque Tp is calculated, the limit torque $Te_{MAX}$ is continuously updated according to a road surface condition. In other words, in a state in which the front wheels 1FL and 1FR are not subjected to the acceleration slip (i.e., the decision in S208 is "Yes"), and when the front wheel driving force Tf is larger than the maximum value $Tf_{MAX}$ (i.e., the decision in S209 is "Yes"), there is still a margin before the engine torque Te reaches the limit torque $Te_{MAX}$. In such a case, since it is considered that the friction coefficient of the road surface increases, the limit torque $Te_{MAX}$ is raised by updating the maximum value Tf to the current front wheel driving force Tf (S210). On the other hand, in a state in which the front wheels 1FL and 1FR are subjected to the acceleration slip (i.e., the decision in S208 is "No"), and when the front wheel driving force Tf is smaller than the maximum value $Tf_{MAX}$ (i.e., the decision in S212 is "Yes"), it means that the engine torque Te still exceeds the limit torque $Te_{MAX}$. In such a case, since it is considered that the friction coefficient of the road surface decreases, the limit torque $Te_{MAX}$ is lowered by updating the maximum value $Tf_{MAX}$ to the current front wheel driving force Tf (S213). In this way, an accurate excessive torque Tp is calculable by continuously updating the limit torque $Te_{MAX}$ according to the road surface condition.

Moreover, the needed electric power Pm* to be needed by the electric motor 3 is calculated, and the target electric power Pg* to be output by the generator 7 is calculated from this needed electric power Pm*. The field current Ig of the generator 7 is controlled in such a manner that this target electric power Pg* conforms to the actual output electric power Pg. Accordingly, the generator 7 can accurately supply the needed electric power Pm* to be needed by the electric motor 3, and can accurately output the target motor torque Tm*.

Further, since the field current Ig of the generator 7 is detected by the current sensor, and the feedback control is performed in such a manner that the actual field current Ig follows the target field current Ig*, the output electric power Pg can be reliably made to follow the target electric power Pg*.

It should be noted that, according to an embodiment of the present invention, the first motor torque Tm1 is calculated according to the front wheel slip speed ΔV. However, the present invention is not limited to this. In short, the first motor torque Tm1 should be calculated according to the slipping tendency of the front wheels 1FL and 1FR. Consequently, for example, the first motor torque Tm1 may be calculated according to wheel acceleration or a slip ratio of the front wheels 1FL and 1FR.

Further, according to an embodiment of the present invention, the front wheels 1FL and 1FR serve as the main drive wheels driven by the engine 2, and the rear wheels 1RL and 1RR serve as the auxiliary drive wheels drivable by the electric motor 3. However, the present invention is not limited to this. The rear wheels 1RL and 1RR may serve as the main drive wheels, and the front wheels 1FL and 1FR may serve as the auxiliary drive wheels.

Additionally, according to an embodiment of the present invention, a power train of one motor system is employed such that the rear wheels 1RL and 1RR are driven by one electric motor 3. However, the present invention is not limited to this. According to an embodiment of the present invention, for example, a two motor system, in which right and left wheels are individually driven by two electric motors, or an in-wheel motor system, in which motor is disposed at an unsprung (i.e., wheel side) may be employed.

Further, according to an embodiment of the present invention, the DC motor is used for the electric motor 3, but an AC motor may be used.

Furthermore, the present invention is applied to the four wheel vehicle, according to an embodiment of the present invention. However, the present invention may be applied to a two wheel vehicle, a three wheel vehicle, or a five wheel vehicle or more.

Next, substantial parts according to an embodiment of the present invention will be described.

According to an embodiment of the present invention, when a part of the engine torque Te is converted into the electric energy and the electric energy is then converted into the motor torque Tm, there is an energy loss based on the conversion efficiency. For example, in a case where 20% of the engine torque Te is utilized for conversion into the motor torque Tm, when the conversion efficiency at that time is 60%, 0.2×0.6=0.12, and the motor torque Tm to the engine torque Te is substantially 12%. In other words, 0.8 of the engine torque Te+0.12 of the motor torque Tm makes 0.92 of the total driving force of a vehicle. Therefore, when the distribution ratio of the motor torque Tm is enhanced in a state in which the acceleration slip does not occur at the front wheels 1FL and 1FR, the total driving force of a vehicle is reduced by the energy loss. Consequently, the acceleration performance is deteriorated in a vehicle in which engine displacement is smaller, e.g., three cylinders, and particularly, there is a possibility that slowness occurs at the time of starting.

Figure 15:
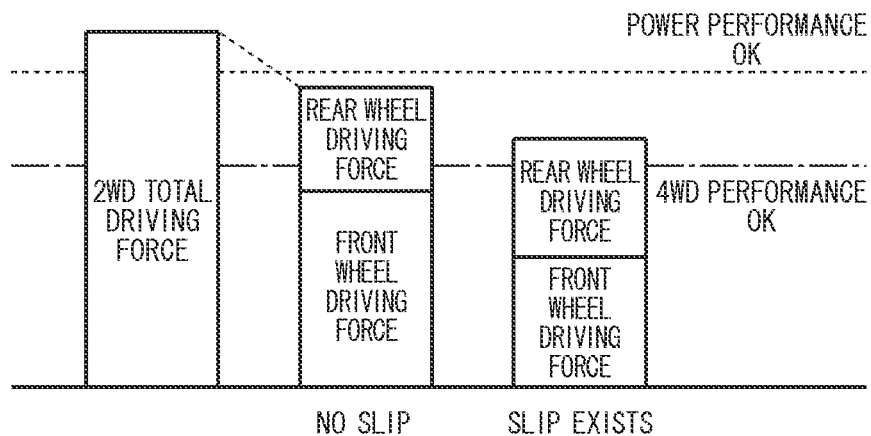
FIG. 15 is a diagram illustrative of power performance and four wheel driving performance.

FIG. 15 is a diagram illustrative of power performance and four wheel driving performance.

Since the rear wheel driving force is generated from a part of the engine torque, when the power distribution ratio from the engine torque to the rear wheel driving force is enhanced, the total driving force of a vehicle is reduced by the loss based on the conversion efficiency. At this time, in a condition where the acceleration slip easily occurs at the front wheels 1FL and 1FR, since smooth and stable start and travel can be achieved by enhancing the power distribution ratio α, the four wheel driving performance more than offsetting deterioration of the power performance can be exhibited. However, in a condition where the acceleration slip hardly occurs at the front wheels 1FL and 1FR, it is desirable to suppress deterioration of the power performance than to improve the four wheel driving performance.

Hence, according to an embodiment of the present invention, when the part of the engine torque Te is converted into the motor torque Tm through the generator 7, the power distribution ratio α from the engine torque Te to the motor torque Tm is set. In addition, as the road surface gradient θ is smaller on the upward slope side, the power distribution ratio α is limited (step S118).

Specifically, when the road surface gradient θ is larger than or equal to the predetermined θ1 (e.g., 15%) on the upward slope side, the power distribution ratio α is set to the predetermined maximum value $\alpha_{MAX}$ (e.g., 20%). When the road surface gradient θ is smaller than or equal to θ2 (e.g., 10%), which is smaller than θ1, on the upward slope side, the power distribution ratio α is set to the minimum value $\alpha_{MIN}$ (e.g., 5%). Then, when the road surface gradient θ falls within the range from θ1 to θ2 on the upward slope side, as the road surface gradient θ is smaller on the upward slope side, the power distribution ratio α is set small within the range from the maximum value $\alpha_{MAX}$ to the minimum value $\alpha_{MIN}$.

Then, the second limit value TL2 according to this power distribution ratio α is set (step S120), and the first motor torque Tm1 according to the opening degree Acc of the accelerator pedal is limited to the second limit value TL2 or less. In other words, by the selection process to be performed by the selecting unit 56, the smaller one of the first motor torque Tm1 and the second limit value TL2 is selected as a new first motor torque Tm1.

In this way, as the road surface gradient θ is smaller on the upward slope side, that is, in the condition where the acceleration slip of the front wheels 1FL and 1FR hardly occurs, the energy loss based on the conversion efficiency is reduced by limiting the road surface gradient θ, so that the total driving force according to the acceleration request of a driver can be secured. Therefore, even in the vehicle in which displacement of the engine is small, e.g., an engine of three cylinders, deterioration of the acceleration performance, such as slowness at the time of starting, can be suppressed.

Figure 16:
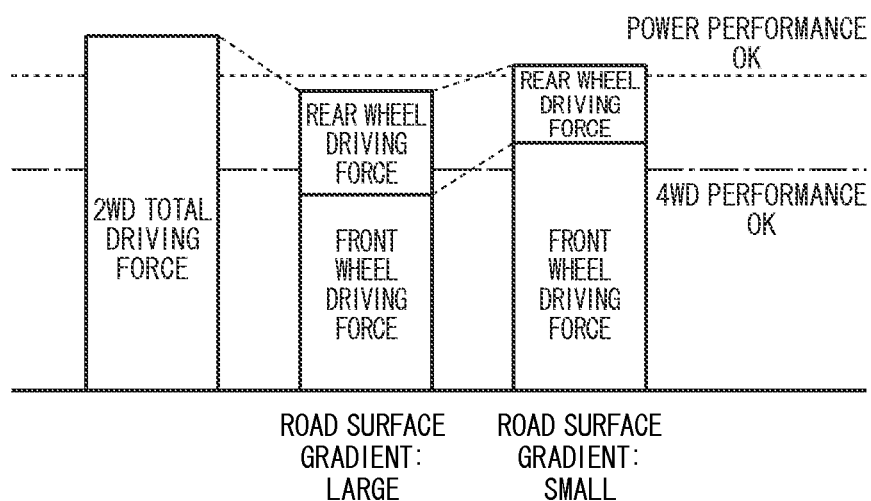
FIG. 16 is a diagram illustrative of power performance and four wheel driving power performance according to an embodiment of the present invention.

FIG. 16 is a diagram illustrative of power performance and four wheel driving performance, according to an embodiment of the present invention.

In a condition where the road surface gradient θ is large (θ1 or more) on the upward slope side and the acceleration slip easily occurs at the front wheels 1FL and 1FR, limitations to the power distribution ratio α are alleviated, and the power distribution ratio α is allowed to the maximum value $α_{MAX}$ (e.g., 20%). With such a configuration, since a certain amount of power distribution ratio α is secured and smooth and stable start and travel is achieved, the four wheel driving performance more than offsetting deterioration of the power performance can be exhibited. On the other hand, in a condition where the road surface gradient θ is small on the upward slope side and the acceleration slip hardly occurs at the front wheels 1FL and 1FR, limitations to the power distribution ratio α are strengthened, and the power distribution ratio α is made smaller than the maximum value $α_{MAX}$. Thus, it is possible to suppress the deterioration of the power performance more than to improve the four wheel driving performance.

It should be noted that, according to an embodiment of the present invention, as illustrated in FIG. 8, the power distribution ratio α is continuously changed within the range from θ1 to θ2. However, the present invention is not limited to this. The power distribution ratio α may be changed in a stepwise manner. Further, it may be changed by only one step, or may have a configuration simply switched between the maximum value and the minimum value $α_{MIN}$.

Moreover, according to an embodiment of the present invention, the power distribution ratio α is set according to the opening degree Acc of the accelerator pedal, and is then converted into the first motor torque Tm1. Alternatively, the power distribution ratio α is limited according to the road surface gradient θ, and is then converted into the second limit value TL2. However, the present invention is not limited to this. For example, referring to a map in FIG. 17, the first motor torque Tm1 may be directly calculated according to the opening degree Acc of the accelerator pedal. Alternatively, referring to a map in FIG. 18, the second limit value TL2 may be directly calculated according to the road surface gradient θ.

Figure 17:
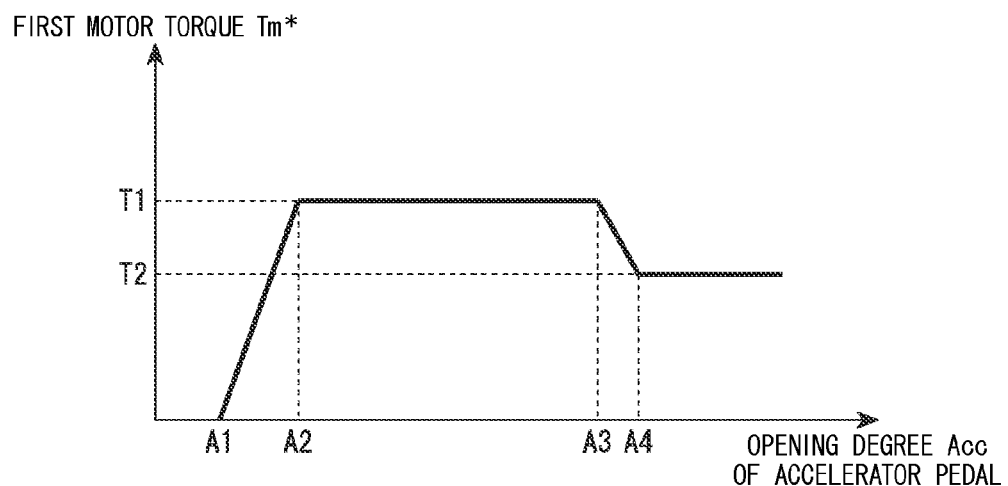
FIG. 17 is a map used for calculation of a first motor torque Tm1.

FIG. 17 is the map used for calculation of the first motor torque Tm1.

In this map, regarding the opening degree Acc of the accelerator pedal, A1 to A4 having a relationship of 0<A1<A2<A3<A4 are determined in advance, and regarding the first motor torque Tm1, T1 (e.g., 10 Nm) and T2 (e.g., 6 Nm) having a relationship of T1>T2 are determined in advance. Then, when the opening degree Acc of the accelerator pedal falls within a range from 0 to A1, the first motor torque Tm1 is maintained at 0. When the opening degree Acc of the accelerator pedal falls within a range from A1 to A2, as the opening degree Acc of the accelerator pedal is larger, the first motor torque Tm1 is increased from 0 to T1. Further, when the opening degree Acc of the accelerator pedal falls within a range from A2 to A3, the first motor torque Tm1 is maintained at T1. When the opening degree Acc of the accelerator pedal falls within a range from A3 to A4, as the opening degree Acc of the accelerator pedal is larger, the first motor torque Tm1 is decreased from T1 to T2. Moreover, when the opening degree Acc of the accelerator pedal is larger than A4, the first motor torque Tm1 is maintained at T2.

Figure 18:
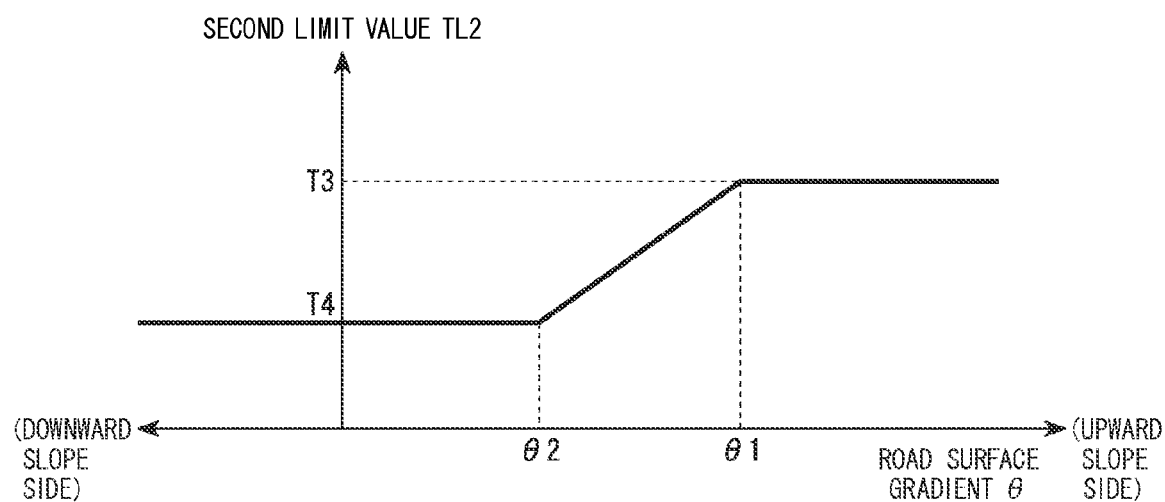
FIG. 18 is a map used for calculation of a second limit value TL2.

FIG. 18 is the map used for calculation of the second limit value TL2.

In this map, regarding the road surface gradient θ, θ2 (e.g., 10%) and θ1 (e.g., 15%) having a relationship of 0<θ2<θ1 on the upward slope side (i.e., positive side) are determined in advance, and regarding the second limit value TL2, T4 (e.g., 3 Nm) and T3 (e.g., 10 Nm) having a relationship of 0<T4<T3 are determined in advance. Then, when the road surface gradient θ falls within a range from 0 to θ2, the second limit value TL2 is maintained at T4. When the road surface gradient θ falls within a range from θ2 to θ1, as the road surface gradient θ is larger, the second limit value TL2 is increased from T4 to T3. When the road surface gradient θ is larger than θ1, the second limit value TL2 is maintained at T3. It should be noted that when the road surface gradient θ is on the downward slope side (i.e., negative side), the second limit value TL2 is maintained at T4.

Further, according to an embodiment of the present invention, the driving force of the electric motor 3 is limited to be small by limiting the power distribution ratio α to be small. However, the present invention is not limited to this. In short, since the driving force of the electric motor 3 only needs to be limited to be small, the driving force of the electric motor 3 may be limited to be small by limiting not the power distribution ratio α but an instruction value (e.g., the target motor torque Tm*) of the electric motor 3 to be small. Moreover, the driving force of the electric motor 3 may be limited to be small by limiting a power generation instruction value (e.g., the target electric power Pg*) to the generator 7 to be small.

Heretofore, the front wheels 1FL and 1FR correspond to "main drive wheels", the rear wheels 1RL and 1RR correspond to "auxiliary drive wheels", and the generator 7 corresponds to "electric generator". Further, the 4WD controller 19 corresponds to "electric motor control unit", the first motor torque calculating unit 51, the second limit value calculating unit 53, and the selecting unit 56 correspond to "distribution ratio setting units", and the acceleration sensor 29 corresponds to "gradient detecting unit". Moreover, the power distribution ratio α set by the first motor torque calculating unit 51 corresponds to "first power distribution ratio", and the power distribution ratio α set by the second limit value calculating unit 53 corresponds to "second power distribution ratio".

ADVANTAGEOUS EFFECTS (1) The vehicle drive control apparatus according to an embodiment of the present invention includes the engine 2 for driving the front wheels 1FL and 1FR, the generator 7 for generating electric power by obtaining the power of the engine 2, the electric motor 3 for driving the rear wheels 1RL and 1RR with the electric power generated by the generator 7. Then, as the road surface gradient θ is smaller on the upward slope side, the motor torque Tm is reduced.

In this way, as the road surface gradient θ is smaller on the upward slope side, that is, in the condition where the acceleration slip of the front wheels 1FL and 1FR hardly occurs, the motor torque Tm is reduced. Consequently, the energy loss based on the conversion efficiency is reduced, and the total driving force according to the acceleration request of a driver can be secured. Therefore, even in the vehicle in which displacement of the engine 2 is small, deterioration of the acceleration performance, such as slowness at the time of starting, can be suppressed.

(2) According to the vehicle drive control apparatus according to an embodiment of the present invention, when the part of the engine torque Te is distributed to the motor torque Tm through the generator 7, the power distribution ratio α from the engine torque Te to the motor torque Tm is set, and as the road surface gradient θ is smaller on the upward slope side, the power distribution ratio α is limited.

In this way, as the road surface gradient θ is smaller on the upward slope side, by limiting the power distribution ratio α, the energy loss based on the conversion efficiency is reduced, and the total driving force according to the acceleration request of a driver can be secured. Therefore, even in the vehicle in which displacement of the engine 2 is small, deterioration of the acceleration performance, such as slowness at the time of starting, can be suppressed.

(3) According to the vehicle drive control apparatus according to an embodiment of the present invention, when the road surface gradient θ is more than or equal to the predetermined θ1 on the upward slope side, the power distribution ratio α is set to the predetermined maximum value $\alpha_{MAX}$. When the road surface gradient θ is less than or equal to θ2 on the upward slope side, the power distribution ratio α is set to the minimum value $\alpha_{MIN}$. Further, when the road surface gradient θ falls within the range from θ1 to θ2 on the upward slope side, as the road surface gradient θ is smaller on the upward slope side, the power distribution ratio α is set small within the range from the maximum value $\alpha_{MAX}$ to the minimum value $\alpha_{MIN}$.

In this way, as the road surface gradient θ is smaller on the upward slope side, by gradually strengthening limitations to the power distribution ratio α, balance between the power performance and the four wheel driving performance can be optimized.

(4) According to the vehicle drive control apparatus according to an embodiment of the present invention, the first motor torque Tm1 is set by the power distribution ratio α according to the opening degree Acc of the accelerator pedal, and the second limit value TL2 is set by the power distribution ratio α according the road surface gradient θ. Then, the smaller of the first motor torque Tm1 and the second limit value TL2 is selected as a new first motor torque Tm1.

In this way, the target motor torque Tm* is set by select low of the first motor torque Tm1 and the second limit value TL2. Consequently, while securing the four wheel driving performance, the total driving force according to the acceleration request of a driver is realized, and the power performance can be enhanced.

(5) According to the vehicle drive control method according to an embodiment of the present invention, the engine 2 drives the front wheels 1FL and 1FR, the generator 7 generates electric power by obtaining the power of the engine 2, the electric motor 3 drives the rear wheels 1RL and 1RR with the electric power generated by the generator 7. Then, when the part of the engine torque Te is converted into the motor torque Tm through the generator 7, the power distribution ratio α from the engine torque Te to the motor torque Tm is set. Also, as the road surface gradient θ is smaller on the upward slope side, by reducing the power distribution ratio α, the motor torque Tm is limited to be small.

In this way, as the road surface gradient θ is smaller on the upward slope side, that is, in the condition where the acceleration slip of the front wheels 1FL and 1FR hardly occurs, the power distribution ratio α is limited. Consequently, the energy loss based on the conversion efficiency is reduced, and the total driving force according to the acceleration request of a driver can be secured. Therefore, even in the vehicle in which displacement of the engine 2 is small, deterioration of the acceleration performance, such as slowness at the time of starting, can be suppressed.

Hereinabove, hereinabove, the entire contents of Patent Application No. 2012-040363 (filed on Feb. 27, 2012), from which the present application claims the priority, are hereby incorporated as a reference.

While the present invention has been described herein referring to a limited number of embodiments, the scope of the present invention is not limited to them. Modifications and variations of the embodiments based on the above-described disclosure are apparent to those skilled in the art.

REFERENCE SIGNS LIST

1FL, 1FR front wheels
1RL, 1RR rear wheels
2 engine
3 electric motor
4 automatic transaxle
6 V belt
7 generator
8 power cable
9 decelerator
10 electromagnetic clutch
11 differential gear
12 intake pipe passage
13 throttle valve
14 engine controller
15 accelerator sensor
16 accelerator pedal
17 throttle motor
19 4WD controller
19A target motor torque operating unit
19B motor needed electric power operating unit
19C electric power generation control unit
19D motor control unit
19E clutch control unit
20 regulator
21 junction box
22 main relay
23 current sensor
24 thermistor
25 motor rotation sensor
26 engine speed sensor
27 throttle sensor
28FL to 28RR wheel speed sensor
29 acceleration sensor
30 shift sensor
31 brake switch
40 target electric power calculating unit
41 limit value calculating unit
42 final target electric power calculating unit
43 control processing unit
43a output electric power calculating unit
43b target field current calculating unit
43c field current control unit
51 first motor torque calculating unit
52 first limit value calculating unit
53 second limit value calculating unit
54 second motor torque calculating unit
55 excessive torque calculating unit
56 selecting unit 57 selecting unit
58 selecting unit
59 switching unit
Tm motor torque (Tm* is a target value)
Tm1 first motor torque
TL1 first limit value
TL2 second limit value
Tm2 second motor torque
TP excessive torque
TS starting motor torque
TD traveling motor torque

The invention claimed is:

1. A vehicle drive control apparatus, comprising:
an engine configured to drive a main drive wheel;
an electric generator configured to generate electric power with power of the engine;
an electric motor configured to drive an auxiliary drive wheel with the electric power generated by the electric generator;
a gradient detecting unit configured to detect a road surface gradient of an upward slope road; and
a distribution ratio setting unit configured to set a power distribution ratio of power of the electric motor distributed from the power of the engine, when a part of the power of the engine is distributed to the power of the electric motor through the electric generator,
wherein the power distribution ratio setting unit is configured to set a first power distribution ratio according to an accelerator operation of a driver, set a second power distribution ratio such that as the road surface gradient is smaller, the power distribution ratio is smaller, and set a smaller one of the first power distribution ratio and the second power distribution ratio, as a final power distribution ratio.

2. The vehicle drive control apparatus according to claim 1,
wherein when the road surface gradient is larger than or equal to a predetermined first threshold value on an upward slope side, the power distribution ratio setting unit is configured to set the power distribution ratio to a predetermined maximum value,
wherein when the road surface gradient is smaller than or equal to a second threshold value, which is smaller than the first threshold value, on the upward slope side, the power distribution ratio setting unit is configured to set the power distribution ratio to a predetermined minimum value, and
wherein when the road surface gradient falls within a range from the first threshold value to the second threshold value on the upward slope side, as the road surface gradient is smaller on the upward slope side, the power distribution ratio setting unit is configured to set the power distribution ratio to be smaller within the range from the maximum value to the minimum value.

3. A vehicle drive control method, comprising:
driving a main drive wheel by an engine;
generating electric power, by an electric generator, by obtaining power of the engine;
driving an auxiliary drive wheel by an electric motor with the electric power generated by the electric generator;
setting a power distribution ratio of power of the electric motor distributed from the power of the engine, when a part of the power of the engine is distributed to the power of the electric motor through the electric generator; and
setting a first power distribution ratio according to an accelerator operation of a driver, setting a second power distribution ratio such that as a road surface gradient is smaller, the power distribution ratio is smaller, and setting a smaller one of the first power distribution ratio and the second power distribution ratio, as a final power distribution ratio.

* * * * *